Oct. 22, 1946.  H. E. MORTON  2,409,995
HYDRAULIC CLUTCH
Filed April 5, 1944  3 Sheets-Sheet 1

INVENTOR.
Henry Earl Morton
BY Charles W. Dake
Attorney

Oct. 22, 1946.   H. E. MORTON   2,409,995
HYDRAULIC CLUTCH
Filed April 5, 1944   3 Sheets-Sheet 2

Fig-2-

INVENTOR.
Henry Earl Morton
BY Charles W. Dake
Attorney

Oct. 22, 1946.   H. E. MORTON   2,409,995
HYDRAULIC CLUTCH
Filed April 5, 1944   3 Sheets-Sheet 3

INVENTOR.
Henry Earl Morton,
BY
Charles W. Dake
Attorney

Patented Oct. 22, 1946

2,409,995

UNITED STATES PATENT OFFICE 2,409,995

HYDRAULIC CLUTCH

Henry Earl Morton, Muskegon, Mich.

Application April 5, 1944, Serial No. 529,561

2 Claims. (Cl. 192—58)

The present invention relates to improvements in hydraulic clutches in which a plurality of clutch blocks coact in conjunction with a driving cam ring to rotate a drive shaft and are caused to engage the cam ring by oil pressure; and the objects of improvement are: first, to provide a hydraulic clutch that will be free from metallic shocks when in operation; second to provide a hydraulic clutch that will withstand heavy duty without functional interruption; third, to provide a hydraulic clutch that will be readily understood; fourth, to provide a hydraulic clutch that will be quiet in operation; fifth, to provide a hydraulic clutch that will be self lubricating.

Figure 1:
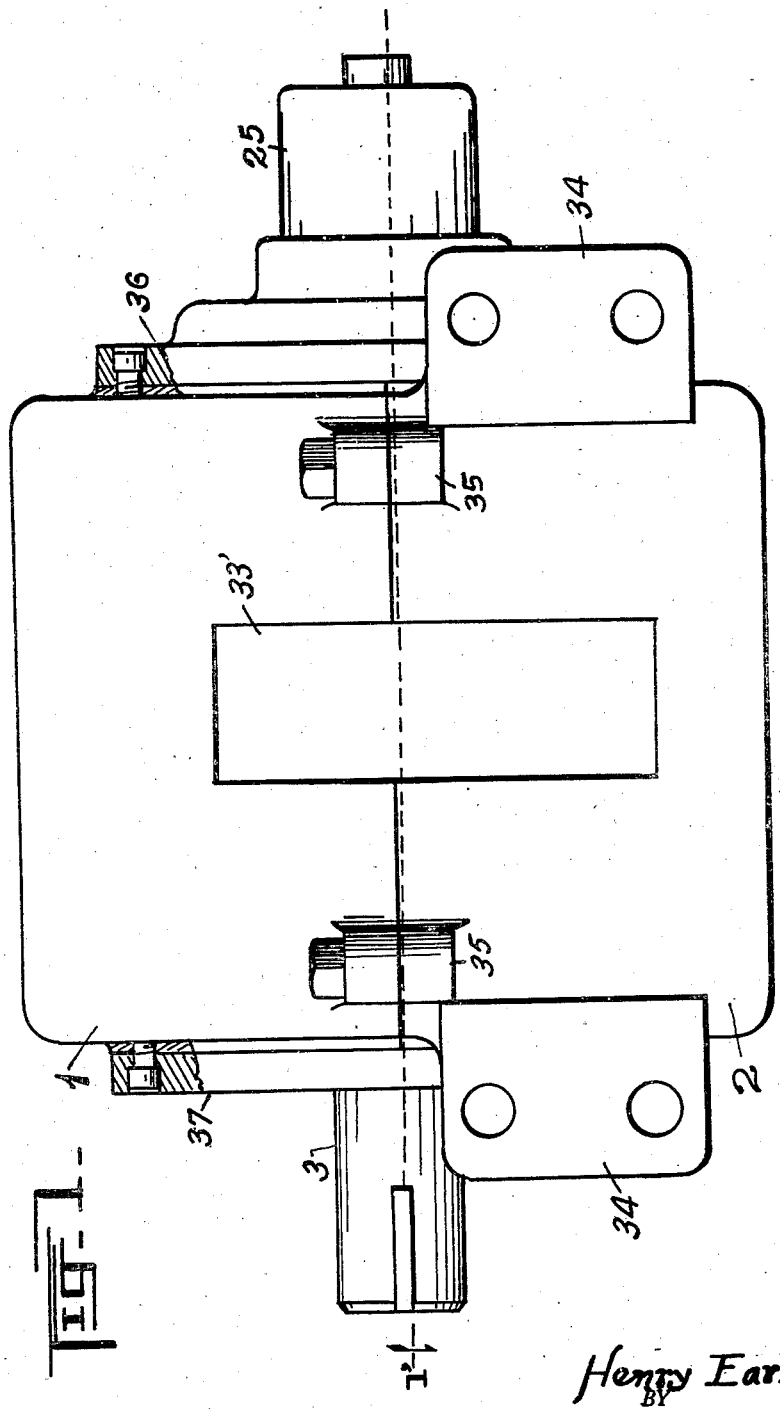
Figure 2:
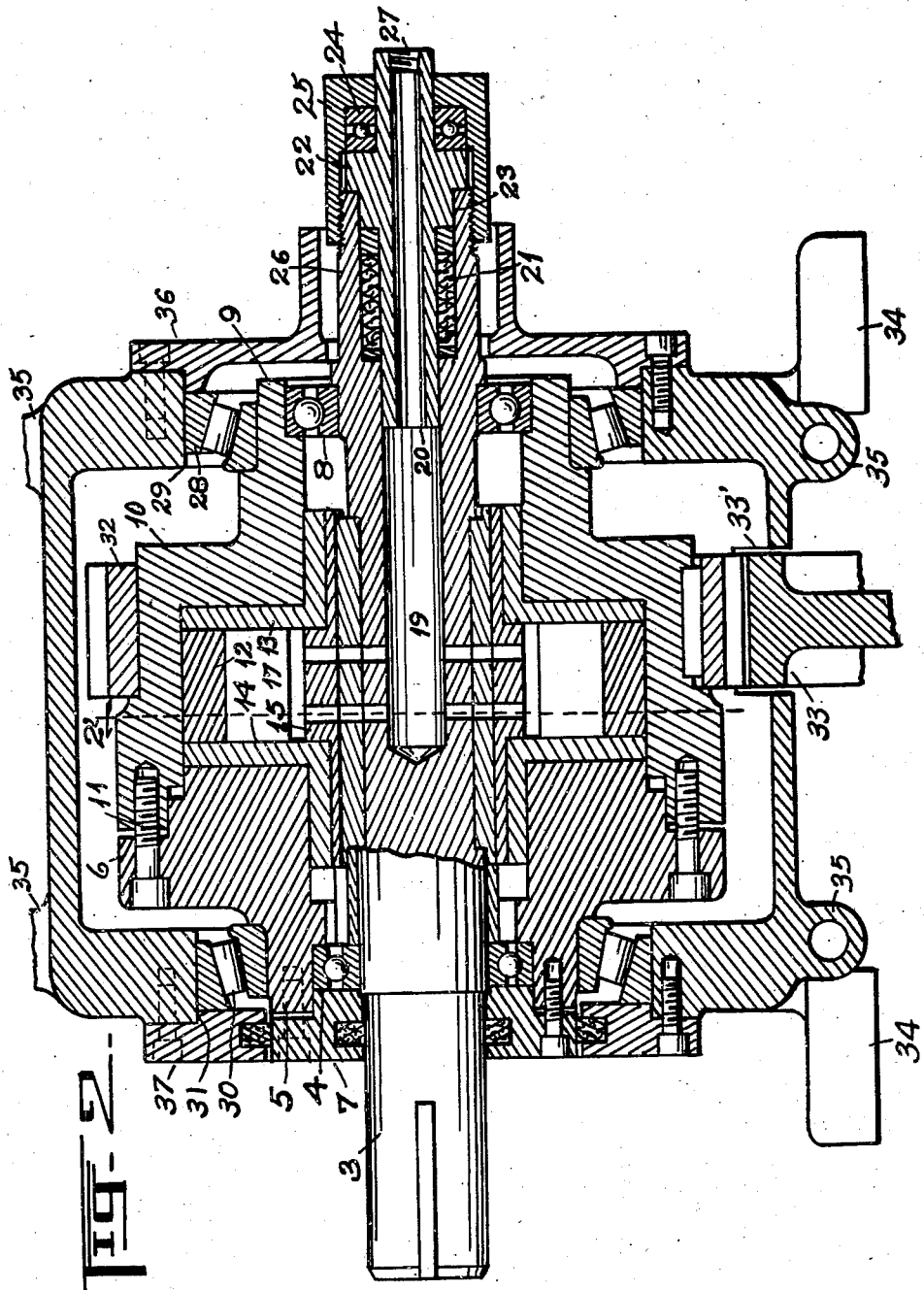
Figure 3:
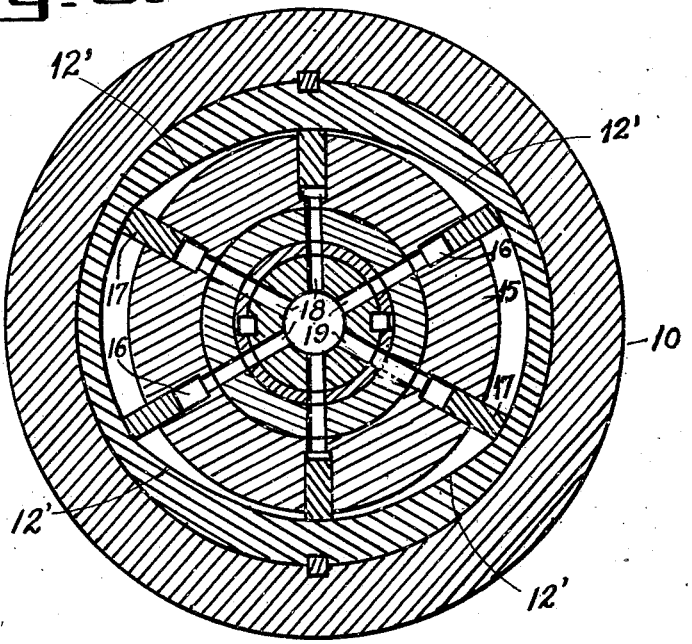
Figure 4:
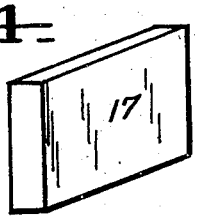

These named objects and such other objects as may appear from a perusal of the following description taken with reference to the accompanying drawings, are attained by the structure disclosed in the said drawings, in which:

Figure 1 is a side elevation view of the clutch; Figure 2 a part sectional view taken looking downward from a horizontal plane extending along line 1' of Figure 1; Figure 3 a cross-sectional view extending transversely of the shaft and clutching mechanism taken on line 2' of Figure 2 and looking in the direction the arrow indicates; and Figure 4, a perspective view of one of the clutch blocks.

Throughout the several views of the drawings, similar numerals refer to similar parts and portions of the present hydraulic clutch structure, and referring thereto:

Numeral 1 designates the upper portion of the clutch housing and 2 the lower portion in which is shown, as in Figure 1, mounted the clutch mechanism in part section, consisting of driven shaft 3 rotatably supported by bearing 4 mounted in hub 5 of driving flange portion 6 and held therein by shaft packing flange 7 screw-bolted thereto. The said shaft 3 is supported at its opposite end from bearing 4 by bearing 8 mounted on hub 9 of drive flange portion 10 secured to drive flange portion 6 by cap screws 11. The drive flange portion 10 has secured therein as by keys at diametrical sides of its periphery ring cam 12. Numeral 12 designates the ring cam having caming surfaces 12' and keyed to the drive flange 10 between L cross sectional wear prevention rings 13 and 14, one of which is secured to the driving flange portion 6 and the other to driving flange portion 10 in spaced apart relation to each other. Mounted on the shaft 3 and keyed thereto, and rotatable between the L cross-sectional wear prevention rings, is clutch block carrier 15 having a plurality of transverse slots 16, each having radially slidable therein, clutch blocks 17 set outward against the inner periphery and cam surfaces 12' of the driving ring cam 15 by oil under pressure delivered to the slots through ports 18 from axially extending port 19 of the shaft 3. Extending into the port 19 from its open end, is a stationary hollow oil delivery sleeve consisting of nozzle portion 20, surrounded by flexible packing 21 and having annular flange 22 of which a portion extends into the bore 23 of the shaft 3. The oil delivery sleeve nozzle 20 is prevented from being forced out of the port 19 of the shaft by oil pressure within the port 20 by thrust bearing 24 mounted in inwardly flanged sleeve 25 screw threaded on the enlarged end 26 of the shaft 3, and is provided with pipe threads 27 for connecting an oil supply conductor pipe for conducting oil under pressure to the port 19 and forcing the oil therefrom through ports 18 to the radially disposed slots 16 and against the clutch blocks 17, and thereby setting the said blocks outward against the ring cam 15.

The drive flange portions 6 and 10 are rotatably supported by roller bearing 28 surrounding hub 9 of the drive flange portion 10 mounted in bore 29 of the clutch housing and roller bearing 30 surrounding hub 5 of the drive flange portion 6 mounted in bore 31 of the said clutch housing. Surrounding the drive flange portion 10 and secured thereto, is ring gear 32. Extending into the clutch housing through opening 33' and engaging gear 32 is a spur gear 33 whereby the drive flange portions 6 and 10 are rotated and by the driving ring cam blocks 17, carrier 15 and shaft 3 are rotated. Numerals 34 designate pads at one side of the lower portion 2 of the clutch housing, 35 bolting lugs through which extend bolts for securing the portions 1 and 2 together; 36 and 37 flanges closing the ends of the clutch housing and holding roller bearings 28 and 30 in bores 29 and 31.

While I have described the shaft 3 as a driven shaft and the drive flange as the drive flange, it should be understood that the shaft may be the driver and the hollow flange a driven member on which is a ring gear engaging a second gear driven thereby.

Referring now to the operation of the present invention consisting of the hydraulic clutch as described, the clutch housing is preferably secured to the side of the machine tool or other devices it is to be operated in connection with, and having a spur gear adapted to extend into the clutch housing and therein engage a ring gear secured to and surrounding the drive flange portion, substantially as shown in Figure 2. The connection having been made, oil under pressure is delivered to the sleeve nozzle 20 by piping screw threaded into the threaded hole 21. From the nozzle 20 the oil is forced into the port 19 of the shaft 3 and from said port through ports 18 to slots 16 back of the clutch blocks 17, thereby setting the clutch blocks outward against the ring cam 12 which has inclined portions 12'. Having forced the oil to the slots 16, the apparatus is started in motion, thereby turning the drive flange, and by the oil engaging the clutch blocks carried by the clutch block carrier secured to the shaft 3, causes the shaft to rotate by reason of the resistance caused by the said inclined portions of the ring cam against which the clutch blocks are forced by the oil under pressure within the slots 16, the degree of pressure being regulated by the pressure or amount of oil forced through the nozzle 20.

Having described my present invention, the rights which I desire to secure by Letters Patent are:

1. In a hydraulic clutch; the combination with a clutch housing having a bore at each of its ends; a roller bearing mounted in each of said bores and carrying a drive flange comprising two dissimilar portions fastened together in face to face relation to each other, with one portion of the drive flange having a recess with a cam ring fastened therein and having at its opposite sides at its inner periphery a pair of opposed inclined cam portions; a driven shaft extending longitudinally through the clutch housing and drive flange portions and carried by ball bearings mounted in a hub of each drive flange portion; a clutch block carrier carried by the said shaft between the two portions of the drive flange portions and having a plurality of radially extending slots, each having a clutch block slidable outwardly therein by oil under pressure conducted to the said slots by ports extending radially from a port extending axially of the shaft from one end thereof, and closed at one end by a nozzle extending into the bore for conducting oil under pressure to the said bore and having an annular flange engaging a thrust bearing carried by an inwardly flanged sleeve secured to the said shaft for retaining the nozzle in the shaft against pressure of oil within the shaft.

2. In a hydraulic clutch; the combination with a clutch housing having a bore at each of its ends; a bearing mounted in each of said bores and carrying a drive flange comprising two portions fastened together in face to face relation to each other, with one portion of the drive flange having a recess with a cam ring fastened therein and having at its opposite sides at its inner periphery, a pair of opposed inclined cam portions; a driven shaft extending longitudinally through the clutch housing and drive flange portions and carried by bearings mounted in a hub of each drive flange portion; a clutch block carrier carried by the said shaft between the two portions of the drive flange portions and having a plurality of radially extending slots each having a clutch block slidable outwardly therein by oil under pressure conducted to the said slots by ports extending radially from a port extending axially of the shaft from one end thereof, and closed at one end by a nozzle extending into the bore for conducting oil under pressure to the said bore and having an annular flange engaging a thrust bearing carried by an inwardly flanged sleeve secured to the said shaft for retaining the nozzle in the shaft against pressure of oil within the shaft.

HENRY EARL MORTON.